United States Patent
Shimomura et al.

(10) Patent No.: US 8,471,419 B2
(45) Date of Patent: Jun. 25, 2013

(54) STATOR FOR ROTATING ELECTRIC MACHINE AND MANUFACTURING METHOD FOR THE SAME

(75) Inventors: Ryuichi Shimomura, Tokyo (JP); Hiroyuki Akita, Tokyo (JP); Takumi Nakaue, Tokyo (JP); Atsushi Sakaue, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 268 days.

(21) Appl. No.: 12/741,312

(22) PCT Filed: Nov. 5, 2008

(86) PCT No.: PCT/JP2008/003192
§ 371 (c)(1),
(2), (4) Date: Mar. 9, 2011

(87) PCT Pub. No.: WO2009/060600
PCT Pub. Date: May 14, 2009

(65) Prior Publication Data
US 2011/0156512 A1 Jun. 30, 2011

(30) Foreign Application Priority Data
Nov. 9, 2007 (JP) .................................. 2007-291874

(51) Int. Cl.
*H02K 3/18* (2006.01)
*H02K 15/04* (2006.01)
*H02K 3/52* (2006.01)
*H02K 15/095* (2006.01)

(52) U.S. Cl.
USPC ............................... 310/71; 310/185; 29/596

(58) Field of Classification Search
USPC ..................................................... 310/71, 185
See application file for complete search history.

(56) References Cited

U.S. PATENT DOCUMENTS 7,135,799 B2 * 11/2006 Rittmeyer .................... 310/180
7,936,099 B2 * 5/2011 Staudemann et al. ........... 310/71

(Continued)

FOREIGN PATENT DOCUMENTS

| JP | 2001-103700 A | 4/2001 |
| JP | 2002-153003 A | 5/2002 |

(Continued)

OTHER PUBLICATIONS

International Search Report (PCT/ISA/210) for PCT/JP2008/003192 dated Feb. 17, 2009.

*Primary Examiner* — Burton Mullins
(74) *Attorney, Agent, or Firm* — Buchanan Ingersoll & Rooney PC

(57) ABSTRACT

The present invention relates to a rotating electric machine stator that includes connecting members for connecting jumper wires to each other between neighboring magnetic pole coils of the rotating electric machine stator, and its manufacturing method. In a conventional connecting member, its portions to be connected to the jumper wires are figure-U shaped and have openings on the opposite side to a core's end-face where the jumper wires are disposed, so that, in order to insert the jumper wires into the openings, complex drive controls have been required for the connecting portions being figure-U shaped. In order to simplify the drive controls, such connecting portions being made in curved shapes have openings each facing the end-face of a core. It is possible to generally apply the present invention to rotating electric machine stators that obey coil connection specifications.

7 Claims, 10 Drawing Sheets

U.S. PATENT DOCUMENTS

| | | | |
|---|---|---|---|
| 7,948,130 B2* | 5/2011 | Kitagawa | 310/71 |
| 8,035,263 B2* | 10/2011 | Kienzler et al. | 310/71 |
| 8,339,001 B2* | 12/2012 | Ghodsi-Khameneh et al. | 310/71 |
| 2002/0113517 A1 | 8/2002 | Takano | |
| 2003/0011271 A1 | 1/2003 | Takano et al. | |
| 2003/0122445 A1 | 7/2003 | Takano | |
| 2005/0044692 A1 | 3/2005 | Takano et al. | |
| 2007/0222330 A1 | 9/2007 | Innami et al. | |
| 2009/0058215 A1* | 3/2009 | Murakami et al. | 310/208 |
| 2009/0096313 A1 | 4/2009 | Harada et al. | |

FOREIGN PATENT DOCUMENTS

| | | |
|---|---|---|
| JP | 2002-325385 A | 11/2002 |
| JP | 2005-348522 A | 12/2005 |
| JP | 2006-191757 A | 7/2006 |
| JP | 2007-202263 A | 8/2007 |
| JP | 2007-259555 A | 10/2007 |

* cited by examiner

STATOR FOR ROTATING ELECTRIC MACHINE AND MANUFACTURING METHOD FOR THE SAME

BACKGROUND OF THE INVENTION

1. Field of the Invention

The present invention relates to a rotating electric machine stator that includes jumper wires to connect neighboring magnetic pole coils of the rotating electric machine stator, and its manufacturing method.

2. Description of the Invention

The rotating electric machine stator has a yoke, a plurality of teeth each being of a structure protruded in radially inner direction and equally disposed in the inner circumference of the yoke, coils wound around the respective teeth, and a plurality of jumper wires each connecting between the respective coils by wires that are integral with the coils. By energizing the coils wound around the teeth, magnetic poles are formed therein. Note that, the teeth and yoke's portions continuous thereto are usually covered by dielectric members called coil bobbins, and the coils are wound around on the dielectric members covering the teeth. Hereinafter, "to wind coils around teeth" subsumes to wind the coils therearound by means of the coil bobbins.

In order to have the rotating electric machine stator provided with predetermined magnetic pole characteristics, the coils wound around the teeth require satisfying a predetermined coil connection specification. However, if the coil connection specification is to be implemented relying only on the coil winding ways, coil winding steps become too complex, resulting in difficulties to achieve rationalizations and enhance efficiencies. For this reason, a structure and a method that simplify the coil winding steps as much as possible are adopted to implement the coil connection specification by electrically connecting between predetermined jumper wires after winding. Hereinafter, a member for electrically connecting between the jumper wires is referred to as a "connecting member." The connecting member is made of electric conductor(s), and an arrangement for and the number of pieces of connecting members are determined depending on a way of winding coils including the jumper wires. Note that, the connecting member may be coated on its surface(s) with a dielectric material.

With regard to the connecting member, Japanese Laid-Open Patent Publication No. 2002-153003, for example, discloses it as a concentrated member.

Conventional jumper wires are usually disposed at around a yoke. The connecting member described in Japanese Laid-Open Patent Publication No. 2002-153003 has figure-U shaped clamp portions, whereby the jumper wires are caused to come in the figure-U shaped clamp portions, by placing the openings of the figure-U shape directed toward the opposite side from the yoke's end-face, and then by scooping the jumper wires up from the yoke side using the clamp portions themselves. Subsequently, by press-bonding the figure-U shaped clamp portions to electrically connect their inner surfaces with the jumper wires, the jumper wires are electrically connected to each other.

Note that, if not introducing misunderstandings, a simplified expression "magnetic pole portion" may also be used here for a "tooth constituting a magnetic pole." For example, there is a case in which a "coil wound around a tooth constituting a magnetic pole" is expressed briefly as a "coil wound around a magnetic pole portion."

Problems to be Solved by the Invention

Because the conventional connecting member has the structure described above, there have been problems in that, in order to cause jumper wires to come in the figure-U shaped clamp portions, it is required to move the figure-U shaped clamp portions with their openings directed toward the opposite side from a yoke's end-face, to the positions nearer to the yoke side than the jumper-wire positions, and after the movement, such a procedure is next required to move the clamp portions toward the opposite side from the yoke so that the jumper wires are scooped up from the yoke side to come in the figure-U shaped clamp portions, resulting in taking a lot of effort, raising a need for automation of highly functional apparatus for interconnecting the jumper wires because of its being necessarily operable corresponding to the work described above, and further increasing the work hours. When these procedures are to be automated, it is required that the clamp portions of connecting member be moved to positions adjacent to the jumper wires and subsequently be moved toward the core's end-face so that the openings of the clamp portions come lower than the lowest position of the jumper wires. Next, the clamp portions are moved in a direction approximately parallel to the core's end-face and approximately perpendicular to the running direction of the jumper wires, and then the clamp portions are stopped from movement at the positions where the jumper wires come above the openings of the clamp portions. Subsequently, such movements are required that the clamp portions are pulled up in a direction to depart from the core's end-face, and then the clamp portions are stopped from movement at the positions where the jumper wires are come in the clamp portions. Under the state, the clamp portions and the jumper wires are fixed together by fusing or like means such as fusing so as to establish their electrical conduction. Usually, the jumper wires are annularly disposed, and therefore, in order to insert them into the respective openings, rotational drive is also required for the clamp portions. Consequently, as drive controls for the clamp portions, five times of drive controls are required such as the rotational drive, drive to the jumper-wire positions, drive to a direction approaching to the jumper wires, drive to a direction perpendicular to that drive direction, and drive to a direction departing from the jumper wires. According, there have been problems in that time and effort are taken to electrically connect between the conventional connecting member and the jumper wires, and the drive controls become complex when they are automated.

SUMMARY OF THE INVENTION

Means for Solving the Problems

A rotating electric machine stator according to a first aspect of the present invention comprises a core having a plurality of magnetic pole portions, coils wound around the respective plurality of magnetic pole portions, jumper wires for electrically interconnecting the coils adjacent to each other by way of wires integral with the adjacent coils, and connecting members for electrically connecting between the jumper wires placed at different positions, wherein the connecting members each include a plurality of open-figured ports made of conductors that are opened toward an end-face of the core, and an interconnection conductor that is a conductor for interconnecting the plurality of open-figured ports; and the jumper wires are inserted and fixed in the open-figured ports being directed toward the end-face of the core, to electrically connect the wires to the open-figured ports.

In a method of manufacturing a rotating electric machine stator according to the present invention, the method of manufacturing the rotating electric machine stator that comprises coil winding steps at which coils are wound for a plurality of respective magnetic pole portions disposed circumferentially along their core in accordance with a coil connection specification, wherein the coil winding steps for the magnetic pole portions include a jumper-wire disposing step of disposing, between one and another magnetic pole portions, wires integral with the wound coils, as jumper wires, between coil winding processes for the respective magnetic pole portions, the method of manufacturing the rotating electric machine stator further comprises a jumper-wire interconnecting step conducted after the coil winding steps, in which connecting members each including a plurality of open-figured ports made of conductors that are opened in one direction, and an interconnection conductor that is a conductor for interconnecting the plurality of respective open-figured ports, are so placed as the open-figured ports facing an end-face of the core in accordance with the coil connection specification, and the jumper wires are passed through the open-figured ports and then fixed thereon for causing electrical connection, whereby the plurality of jumper wires are electrically connected to each other by way of the interconnection conductor.

Effects of the Invention

A rotating electric machine stator according to a first aspect of the present invention comprises a core having a plurality of magnetic pole portions, coils wound around the respective plurality of magnetic pole portions, jumper wires for electrically interconnecting the coils adjacent to each other by way of wires integral with the adjacent coils, and connecting members for electrically connecting between the jumper wires placed at different positions, wherein the connecting members each include a plurality of open-figured ports made of conductors that are opened toward an end-face of the core, and an interconnection conductor that is a conductor for interconnecting the plurality of open-figured ports; and the jumper wires are inserted and fixed in the open-figured ports being directed toward the end-face of the core, to electrically connect the wires to the open-figured ports, so that it is possible to insert the jumper wires into the open-figured ports of the connecting members in a manner that the open-figured ports fall over the jumper wires, whereby the insertion becomes easier, resulting in simplifying manufacturing of the stator correspondingly.

In a method of manufacturing a rotating electric machine stator according to the present invention, the method of manufacturing the rotating electric machine stator that comprises coil winding steps at which coils are wound for a plurality of respective magnetic pole portions disposed circumferentially along their core in accordance with a coil connection specification, wherein the coil winding steps for the magnetic pole portions include a jumper-wire disposing step of disposing, between one and another magnetic pole portions, wires integral with the wound coils, as jumper wires, between coil winding processes for the respective magnetic pole portions, the method of manufacturing the rotating electric machine stator further comprises a jumper-wire interconnecting step conducted after the coil winding steps, in which connecting members each including a plurality of open-figured ports made of conductors that are opened in one direction, and an interconnection conductor that is a conductor for interconnecting the plurality of respective open-figured ports, are so placed as the open-figured ports facing an end-face of the core in accordance with the coil connection specification, and the jumper wires are passed through the open-figured ports and then fixed thereon for causing electrical connection, whereby the plurality of jumper wires are electrically connected to each other by way of the interconnection conductor, so that it is possible to insert the jumper wires into the open-figured ports of the connecting members in a manner that the open-figured ports fall over the jumper wires, whereby the insertion steps become easier, resulting in simplifying manufacturing of the stator correspondingly.

BRIEF DESCRIPTION OF DRAWINGS

The foregoing and other objects, features, aspects and advantages of the present invention will become more apparent from the following detailed description of the invention when taken in conjunction with the accompanying drawings.

DETAILED DESCRIPTION OF THE PREFERRED EMBODIMENTS

Hereunder, preferred embodiments according to the present invention will be described in detail with reference to the accompanying drawings.

Embodiment 1.

Hereinafter, Embodiment 1 of the present invention will be explained referring to the figures.

Figure 1:
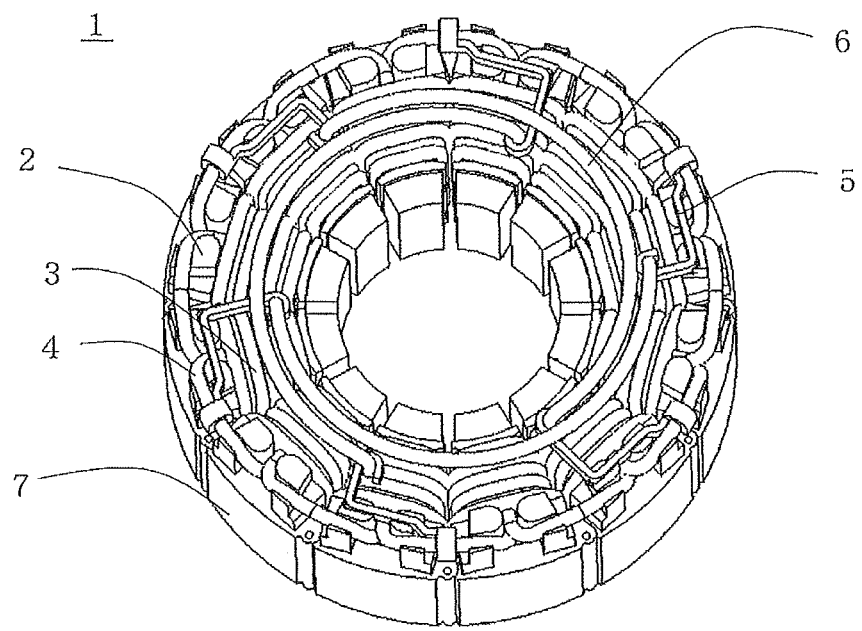
FIG. 1 is a perspective diagram illustrating a rotating electric machine stator according to Embodiment 1 of the present invention.

FIG. 1 is a diagram illustrating a stator of a twelve-slot motor as one example in a rotating electric machine according to the present invention. In FIG. 1, numeral "1" designates the stator; "2," coil bobbins attached onto teeth of a stator core;

"3," coils wound around magnetic pole portions of the stator core by means of the coil bobbins 2; "4," jumper wires between the coils wound around adjacent magnetic pole portions; "5," conductive coil-connecting terminals directly and electrically connected to the jumper wires 4; "6," conductive connection members for electrically connecting the conductive coil-connecting terminals 5 to each other; and "7," a core that is exemplified here by divided cores (hereinafter, the same applies thereto). Here, the coil bobbins 2 are dielectric members having a shape shown in FIG. 5, and attached between the teeth and the coils 3 wound therearound so as to insulate between both. The coils 3 are made of electrically conductive wires that are coated with a dielectric material such as enamel. Note that, conductors for electrically connecting a plurality of jumper wires 4 to each other are referred to as connecting members 10 (not pointed out explicitly in FIG. 1). For example, two pieces of the conductive coil-connecting terminals 5 described above and one of the conductive connection members 6 that are directly and electrically connected to those are one example of a specific structure for the connecting members 10. Depending on how many places that are required to be connected between jumper wires, the required number differs for the conductive coil-connecting terminals 5 and the conductive connection members 6 constituting the connecting members 10. In addition, the conductive coil-connecting terminals 5 and the conductive connection members 6 may be formed as an integral component.

Here, the explanation will be made for a feature of parts at which the connecting members 10 are electrically connected to the jumper wires 4. These parts include open-figured ports opened toward an end-face of the divided cores that are annularly disposed, and the jumper wires 4 and the open-figured ports are electrically connected to each other, by moving the open-figured ports, while facing them toward the end-face of the annularly disposed divided-cores, closer to the jumper wires 4 to insert these jumper wires 4 into the open-figured ports in a manner that the open-figured ports fall over the jumper wires, and then by fixing the jumper wires onto the open-figured ports. FIG. 1 illustrates an example in which the connecting members 10 are constituted of the conductive coil-connecting terminals 5 and the conductive connection members 6. In this example, the open-figured ports of the connecting members 10 designate, in the conductive coil-connecting terminals 5, portions where the jumper wires 4 are inserted into and fixed on. As it can be understood from FIG. 1, these parts are not made in such a manner that the jumper wires 4 are scooped up from the end-face of the annularly disposed divided-cores so that the jumper wires 4 are inserted and fixed as disclosed in Japanese Laid-Open Patent Publication No. 2002-153003, but as described above, the jumper wires 4 are inserted into the open-figured ports in a manner that the open-figured ports fall over the jumper wires from the opposite side from the end-face of the annularly disposed divided-cores, and are then fixed onto the open-figured ports.

Figure 2:
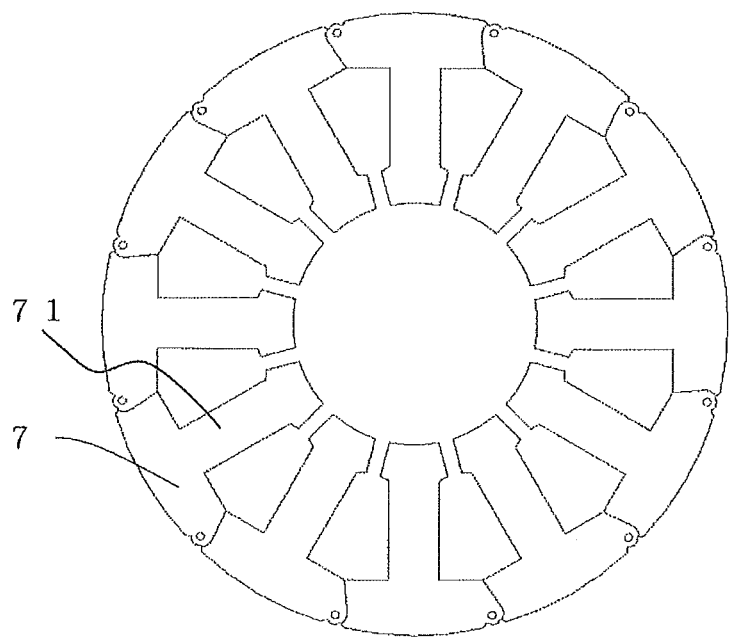
FIG. 2 is a front view showing divided cores according to Embodiment 1 of the present invention.

FIG. 2 is a front view showing the divided cores constituting the stator. In the figure, numeral "7" shows the divided cores. In the example shown here, the divided cores 7 have respective teeth 71 that form twelve magnetic poles in the inner circumference of the divided cores when they are totally assembled as shown in the figure. By winding the coils 3 around the teeth 71 by means of the coil bobbins 2 and energizing the coils, the teeth 71 form the respective magnetic poles.

Figure 3:
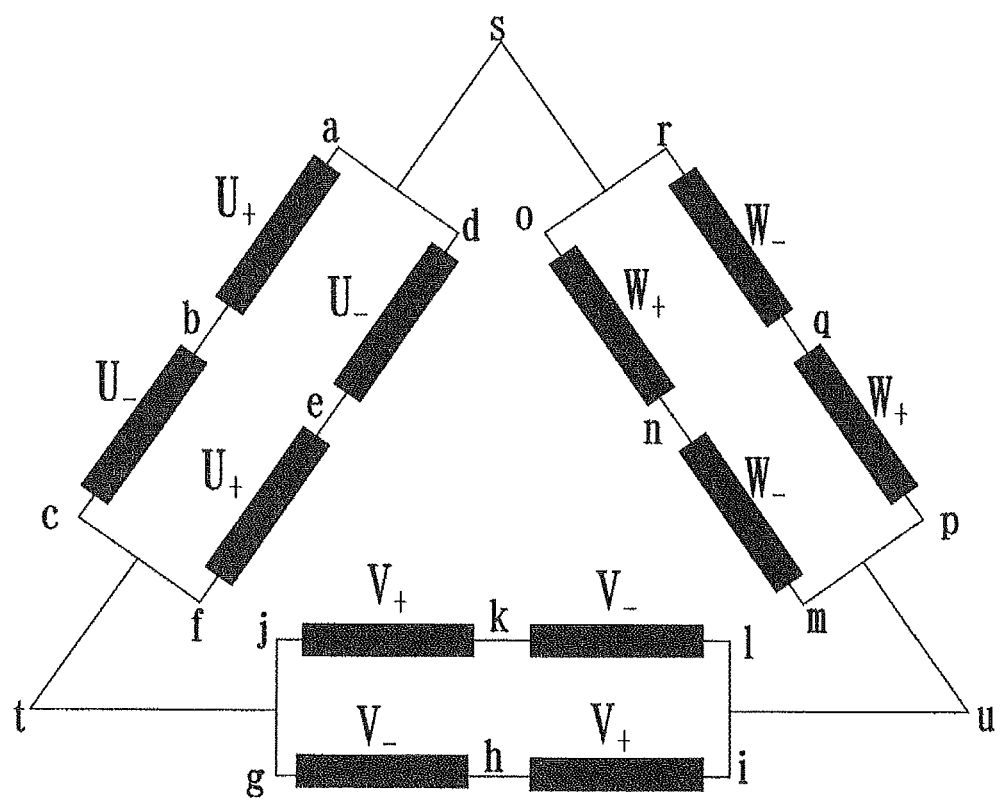
FIG. 3 is a diagram showing a coil connection specification according to Embodiment 1 of the present invention.

FIG. 3 shows one example of a connection diagram for the coils 3 wound around the teeth 71 with the twelve slots shown in FIG. 2. The example shown in FIG. 3 indicates the coils 3 collectively configured in a delta connection corresponding to a three-phase power source, where two coil groups each having serially connected coils are connected in parallel for each of the phases. The respective phases are indicated distinctly as phase-U, phase-V and phase-W for each coil group. Here, notations of $U_+$ and $U_-$, $V_+$ and $V_-$, or $W_+$ and $W_-$ for the respective coils 3 indicate that the rotational current flow directions with the subscripts symbol "+" and "−" are opposite to each other. The lowercase alphabetic characters given to predetermined points in the circuitry of this diagram are added for conveniently explaining a coil connection structure illustrated in FIG. 4.

Figure 4:
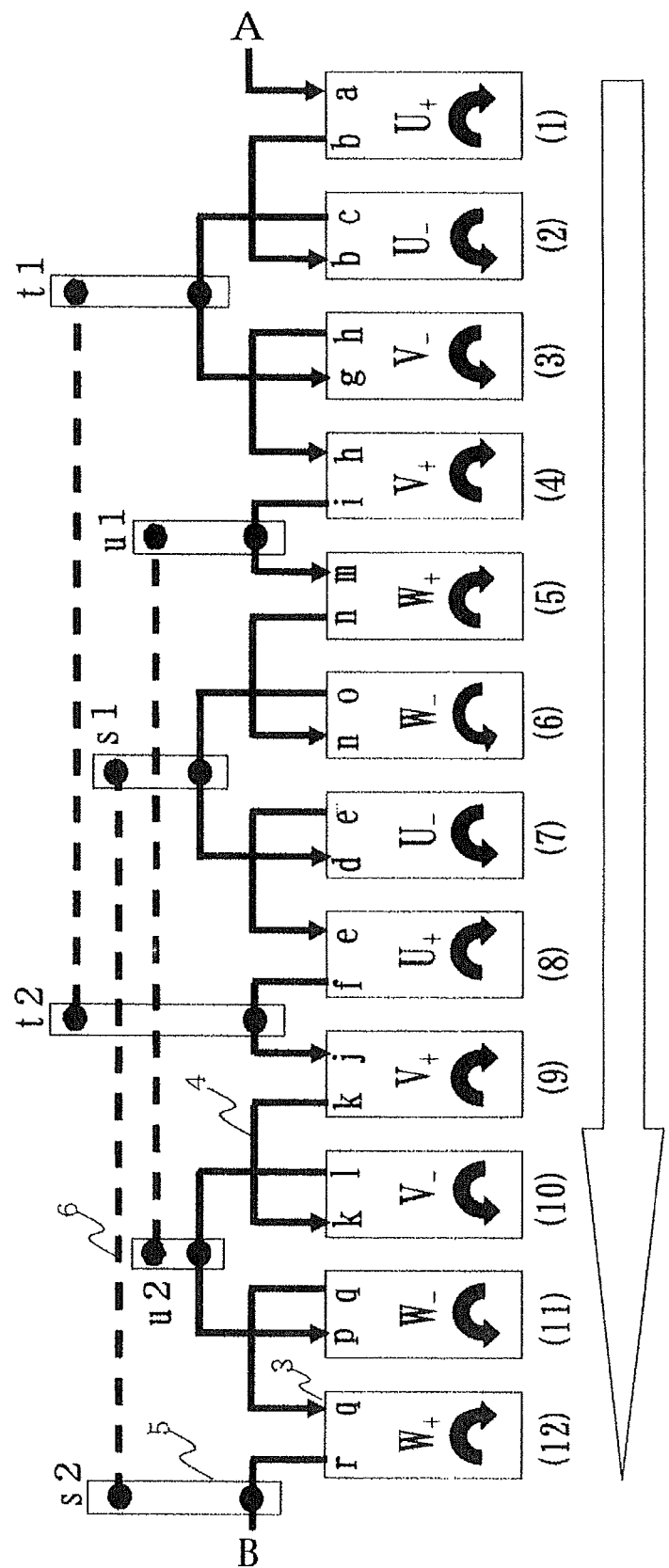
FIG. 4 is a diagram illustrating a coil connection structure according to Embodiment 1 of the present invention.

FIG. 4 illustrates a winding sequence of the coils 3 for the respective teeth 71 described above and the connection diagram between the coils 3, when the coil connection diagram shown in FIG. 3 (hereinafter, referred to as "connection specification") is to be implemented. Symbols from (1) to (12) in the figure indicate the coils 3 wound around the respective teeth 71, and these numbers indicate the winding sequence therefore. Shown by the hollow arrow below these numbers is also a winding direction or winding sequence that indicates the windings for the adjacent teeth 71 sequentially proceeding in one direction. In addition, notations of $U_+$, $U_-$, $V_+$, $V_-$, $W_+$ and $W_-$ for the respective coils 3 shown from (1) to (12) each denote the phase to energize the respective coils 3, and the subscript symbols "+" and "−" also mean the rotational coil-current flow directions being the same or reversed to each other, as already described above. Likewise, the semi-circular arrow symbols shown in parts of the respective coils 3 shown with (1) to (12) distinctly indicate winding directions of the coils 3 (clockwise or counterclockwise) for the respective teeth 71. Therefore, when the winding direction for the phase-$U_+$ is compared with that for the phase-$U_-$, for example, it should be understood that the semi-circular arrow symbols indicate the opposite directions with each other. The lowercase alphabetic characters correspond to those lowercase alphabetic characters designated in FIG. 3, to thereby show a point to point relationship between both of the figures. In addition, the solid arrows "4" indicate the jumper wires 4 between the coils 3 wound around the adjacent teeth 71, and the direction of the arrow coincides with the winding sequence that is the direction of the hollow arrow. The conductive coil-connecting terminals 5 are schematically illustrated by the hollow and narrow rectangles "5" with different heights that are drawn between the coils (2) and (3), (4) and (5), (6) and (7), (8) and (9), (10) and (11), and (12) and (1) as shown in FIG. 4. The dashed lines "6" indicate the conductive connection members 6 for electrically connecting between the conductive coil-connecting terminals 5. Both the solid circles drawn at the overlapping parts between these rectangles "5," namely, the conductive coil-connecting terminals 5 and the solid arrows "4," namely, the jumper wires 4, and the solid circles drawn at the overlapping parts between these rectangles and the dashed lines "6," namely, the conductive connection members 6 indicate that both of the respective members directly and electrically interconnected, for example, by fusing, TIG welding or doing the like. On both ends in the figure, characters "A" and "B" are indicated, which designate a single wire configuration with its both ends indicated by "A" and "B." Although connection to a power source is omitted from the figure, it should be noted that each of the phases for the three-phase power source is connected to the conductive coil-connecting terminals 5 corresponding thereto.

Here, the fusing is referred to a process to achieve electrical conduction by applying thermal swaging using a fusing electrode. In addition, the TIG (tungsten inert gas) welding refers to a welding method using heat-resistant and non-consumable tungsten as an electrode. Welding portions are protected by a shield gas (inert gas such as argon or helium). Because there is no oxygen at the welding places, materials do not undergo oxidation, so that there is a feature that stainless steel or an aluminum alloy can be welded.

Figure 5:
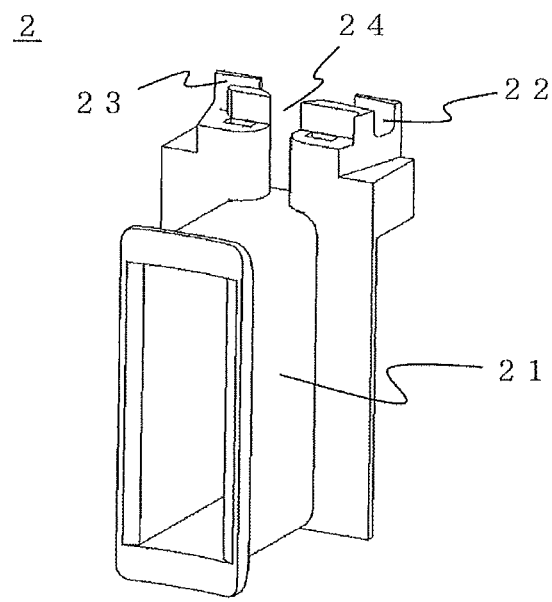
FIG. 5 is a diagram illustrating a coil bobbin according to Embodiment 1 of the present invention.

FIG. 5 shows a coil bobbin 2 that is used when a coil 3 is formed by winding wire around a tooth 71 as already described above. Note that, hereinafter, the "coil 3 is formed by winding wire around" is expressed as the "coil 3 is wound" for brevity of notation.

In the figure, numeral "21" is a coil winding portion that is a portion upon which each of the coils 3 is wound, numerals "22" and "23" each are guide grooves for disposing the jumper wires 4 therein, and they are disposed at the back of the coil bobbin 2, namely in proximity to the circumference of the cores. Numeral "22" is the guide groove for passing through the jumper wire 4 when starting coil winding therefrom, numeral "23" is the guide groove for passing through the jumper wire 4 to an adjacent magnetic pole portion after ended coil winding, and they are disposed in the same circumference after the assembly. Numeral "24" is a pass-through hole provided for the jumper wires 4 between the guide grooves 22 and 23. The coil bobbins 2 are provided for electrically insulating between the teeth 71 and the coils 3 wound therearound, and made of a dielectric material, so that the coils 3 are wound from above on the coil winding portions 21 in the state that the coil bobbins are attached on the teeth 71. The guide grooves are made in such a way that the jumper wires 4 from the adjacent teeth 71 can be mounted over rotational joint centers of the cores 7 that have a joined structure in series with the joints. For this reason, if the divided cores 7 are rotationally moved for the reassembly centering on the joints described above after having ended winding the coils 3 around the teeth 71 of the divided cores 7, there is no need to worry about that the jumper wires 4 may be loosened. Between the guide grooves 22 and 23, the respective jumper-wire pass-through holes 24 for the guide grooves are provided near to a radially inner side of the stator, extending to the surface of the coil winding portions 21. A winding-start jumper wire 4 among the jumper wires 4 firstly enters into the guide groove 22, and passes through the jumper-wire pass-through hole 24 for the guide grooves described above to reach the coil winding portion 21 of the respective coil bobbin 2, and then the coil winding starts. When the winding ends, the wire coming from the coil winding portion 21 again passes through the jumper-wire pass-through hole 24 for the guide grooves, and then passes through the guide groove 23 as a jumper wire to enter into the guide groove 22 of the coil bobbin 2 of the other adjacent tooth 71, and thereafter the above similar processes are performed. Note that, depending on the winding sequence, the roles of the guide grooves 22 and 23 may be reversed.

As described above, by providing these guide groove portions and by causing the jumper wires 4 to pass over the rotational joint centers of the divided cores 7, it is possible to prevent slackening of the jumper wires 4 that may occur due to the rotational movement of the divided cores 7 when the divided cores 7 are reassembled, and as a result, it is possible to prevent slackening of the stator coils 3. In addition, slits for coil guiding grooves, are provided extending toward the radially inner side from the guide groove 22 and the middle portion. Therefore, by utilizing these guide grooves 22 and the jumper-wire pass-through holes 24 for the guide grooves, it is possible to freely select coil winding directions (clockwise, counterclockwise). Even in the case where the coil winding is applied to an integral core, not the divided cores, it is possible to prevent slackening of the stator coils 3 by guiding the jumper wires along guide grooves, and to freely select the coil winding directions (clockwise, counterclockwise) by utilizing the guide grooves 22 and the jumper-wire pass-through holes 24 for the respective guide grooves, so that simplification of the winding steps can be achieved.

Figure 6:
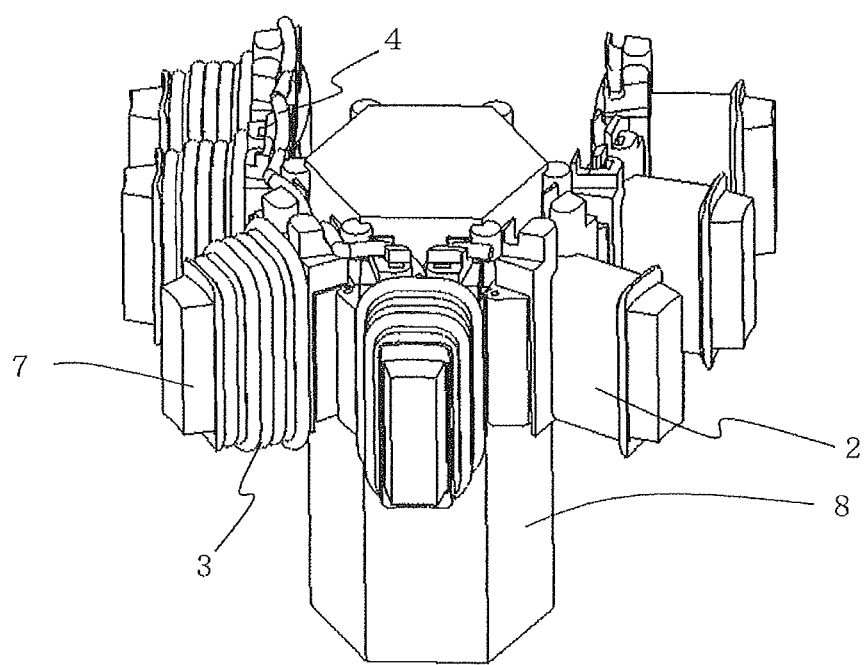
FIG. 6 is a winding diagram with the cores in a reverse-bow state according to Embodiment 1 of the present invention.

FIG. 6 is diagram illustrating that the coil bobbins 2 are attached onto the respective teeth 71 of the divided cores 7, and the coils 3 are wound on the bobbins for every respective teeth 71. In the figure, numeral "8" is called as a teeth fixing and rotating jig that makes the winding work easy by causing the divided cores 7 to attach onto the teeth fixing and rotating jig 8 in the shape reversely bowed with respect to the shape shown in FIG. 1 or FIG. 2 as finally assembled, with the respective teeth 71 disposed along its outer circumference, and by allowing them rotational. The direction of the winding sequence indicated by the hollow arrow in FIG. 4 corresponds to the progress with FIG. 6 in which the coils are wound while rotating the teeth fixing and rotating jig 8 in one direction. With the above situation, the coils are wound for all of the teeth with the respective coils being continuous to each other by means of the jumper wires continuous them, and the divided cores 7 are rounded after the winding steps into a column shape as shown in FIG. 1 or FIG. 2. Note that, after the divided cores 7 are so assembled, the guide grooves 22 and 23 are disposed in proximity to the outermost circumference of the stator, so that the jumper wires 4 that pass through these guide grooves result in also being arranged in proximity to the outermost circumference of the stator. For this kind of the windings, chain-joint type divided cores 9 are usually used as the divided cores.

Figure 7:
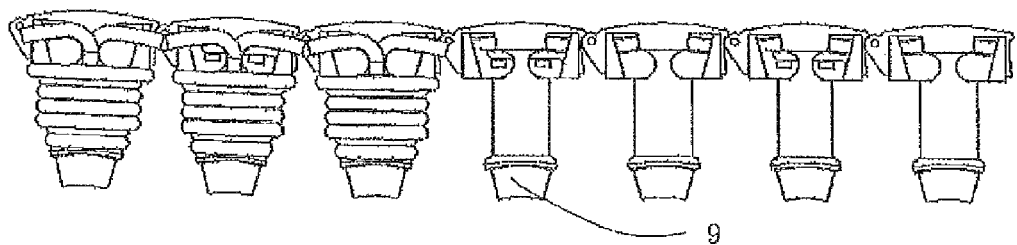
FIG. 7 is a winding diagram with the cores in a straightly aligned state according to Embodiment 1 of the present invention.

FIG. 7 is another example of the coils 3 wound on the coil bobbins 2. Although in FIG. 6 the respective divided cores 7 are taken in a reverse-bow arrangement, the arrangement is not necessarily limited thereto; as shown in FIG. 7, the divided cores may be arranged in a straight line to perform the coil windings, and annularly assembled after the windings. In this case, usually the chain-joint type divided cores 9 are also used. The cores may be thinly laminated and jointed, or may be jointed rotationally movable at punch swaging portions.

Here, the explanation will be made in detail what kind of coil connection structure is implemented in FIG. 4 for the coil connection specification shown in FIG. 3. For conveniently explaining in FIG. 3, the lowercase alphabetic characters designate the points in the circuitry. In addition, these alphabetic characters also designate a coil winding sequence in that order. Therefore, in the following explanation, correspondence relationships with FIG. 4 will be described in the sequential order from "a."

First, symbols "a" and "b" in FIG. 3 indicate both ends of the coil $U_+$, and "b" and "c" indicate both ends of the coil $U_-$.

In FIG. 4, symbol "A" on the right-hand end indicates the coil winding-start part. For the first coil (1), the coil is firstly wound clockwise from a point corresponding to "a," so that the winding-end is "b." For the next adjacent coil (2), a coil energization direction should be in the reversed direction with respect to the coil (1), so that the coil winding direction for the coil (2) is set counterclockwise. For this reason, the winding-start position is reversed with respect to the coil (1). Note that, the wire interconnecting the parts designated by "b" in the respective coil (1) and coil (2) becomes the jumper wire. Hereinafter, the same applies to. Namely, FIG. 4 illustrates that the coils wound around the teeth 71 can be sequentially and continuously wound from the coil (1) to the coil (12) by altering the coil winding directions clockwise or counter-clockwise corresponding to the current direction of each of the phases. However, the coil connection specification in FIG.

3 is not satisfied only by these windings described above. In this regard, an explanation will be made that it is possible to satisfy the coil connection specification shown in FIG. 3 by connecting between predetermined jumper wires 4, in addition to the coil windings described above.

In FIG. 4, illustrated are the conductive coil-connecting terminals 5 directly and electrically connected to the predetermined jumper wires 4, and the conductive connection members 6 for electrically connecting between the conductive coil-connecting terminals 5. Namely, the jumper wires 4 are electrically connected to each other by way of the conductive coil-connecting terminals 5 and the conductive connection members 6 as conductors. The connection specification in FIG. 3 can be implemented by providing the windings for the coils 3 and the jumper wires 4 between the adjacent coils in the sequence of a→b→c→t→g→h→i→u→p→q→r→s→d→e→f→t→j→k→l→u→m→n→o→s.

Referring to FIG. 4, this corresponds to cause tracing sequentially, with the provision of assigning the coil winding-start as "A" and the winding-end as "B," from "A"→a→b→b→c→t (=t1)→g→h→h→i→u(=u1→u2)→p→q→q→r→s (=s2→s1)→d→e→e→f→t(=t2)→j→k→k→l→u (=u2→u1)→m→n→n→o→s(=s1→s2)→to "B," where the symbols s, t and u described in the above correspond to s, t and u in FIG. 3, and the symbols in FIG. 4 corresponding to such symbols are subsequently indicated in the parenthesis notations. In FIG. 4, the jumper wires 4 correspond to: b→b, c→g, h→h, i→m, n→n, o→d, e→e, f→j, k→k, l→p, q→q, and r→a. In this case, the conductive coil-connecting terminals 5 are connected as t1, u1, s1, t2, u2 and s2 to the jumper wires 4 of c→g, i→m, o→d, f→j, l→p, and r→a, respectively; and in addition, the conductive connection members 6 connect between t1 and t2, u1 and u2, and s1 and s2, so that s1 and s2 become corresponding to "s" in FIG. 3; t1 and t2, to "t" in FIG. 3; and u1 and u2, to "u" in FIG. 3, respectively. Note that, "s(=s2→s1)→d" not only indicates that s2 in FIG. 4 corresponds to "s" in FIG. 3, but also indicates that s2 is connected to "d" by way of s1, because s2 in FIG. 4 is connected to s1 by way of the conductive connection member 6. The same also applies to other notations inside the parentheses.

As already described above, the conductive coil-connecting terminals 5 and the conductive connection member 6 may be constituted by a single conductor. Accordingly, it can be understood that the coil connection specification for the delta connection shown in FIG. 3 can be implemented by the coil connection structure shown in FIG. 4.

Next, the explanation will be made referring to FIG. 8 for a manufacturing method of the coil windings of the rotating electric machine stator having the coil connection structure including the windings according to the present invention. Although this winding method is usually automated, details for the automation are omitted here from explanation. In addition, it is presumed that the coil bobbins 2 are in advance attached onto the respective teeth 71.

Figure 8:
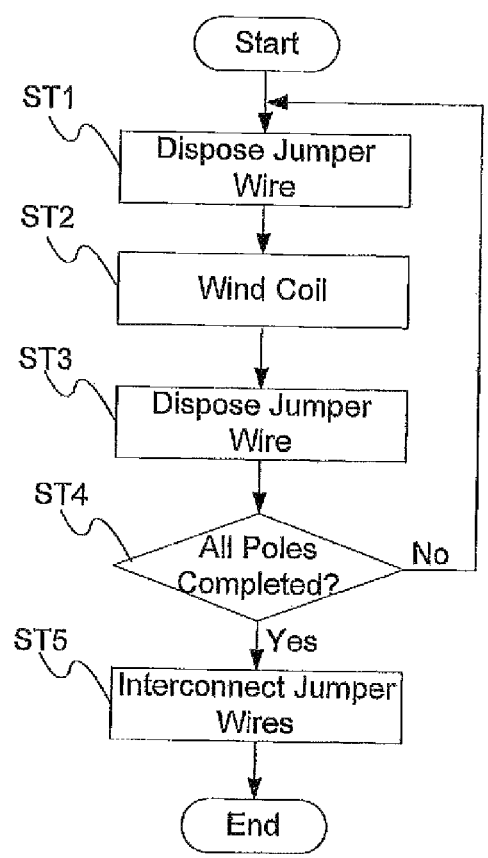
FIG. 8 is a flow chart showing a method of manufacturing the rotating electric machine stator according to Embodiment 1 of the present invention.

Step 1 (=ST1) in FIG. 8 is a first jumper-wire disposing step that is also a preparation step to wind a coil 3 around one predetermined magnetic pole portion selected from a plurality of magnetic pole portions of the stator. First, a wire for the coil 3 is disposed into a winding-start jumper-wire guide groove 22 of the coil bobbin 2, and brought to the coil winding portion 21 through the jumper-wire pass-through hole 24. Step 2 (=ST2) is a coil winding step for the magnetic pole portion to wind the wire around the coil winding portion 21. The winding direction is determined based on the coil energization directions separately specified in the coil connection specification exemplified in FIG. 3, and the coil 3 is wound up to a winding number separately specified. Step 3 (=ST3) is a second jumper-wire disposing step to pass again the wire having been wound through the jumper-wire pass-through hole 24, and to then dispose the wire into the winding-end jumper-wire guide groove 23. At Step 4 (=ST4), it is determined whether or not the windings for all of the magnetic pole portions have been completed: if completed, the processing goes to next Step 5 (=ST5): if not completed, the processing returns to Step 1 (=ST1), whereby Step 1 through Step 4 are sequentially and continuously executed for the adjacent magnetic pole portion(s) in a predetermined direction, and these steps are repeated until it is determined at Step 4 that the windings for all of the magnetic pole portions have been completed. Here, a portion of the wire disposed in the winding-end jumper-wire guide groove 23 of the coil bobbin 2 at each magnetic pole portion and that disposed in the winding-start jumper-wire guide groove 22 of the coil bobbin 2 at the adjacent magnetic pole portion constitute collectively the jumper wire 4 between the coils each wound around the magnetic pole portion and the adjacent magnetic pole portion. Step 5 (=ST5) is a jumper-wire interconnecting step of electrically interconnecting at least two pieces among the jumper wires 4 based on the coil connection specification. By executing the steps described above, the coil connection specification exemplified in FIG. 3 is thus implemented as the coil connection structure shown in FIG. 4.

In this example, the explanation has been made for the case in which the coils are sequentially wound for adjacent magnetic pole portions of the stator by one line of wire without cutting off the wire even once but adapting to the arrangement of the slots. In such a case, the connections between the jumper wires 4 play important roles to satisfy the coil connection specification. However, if it is not the case in which the coils are wound by the one line of wire without cutting it off once, the necessity to electrically interconnect the jumper wires 4 generally arises. In such a case also, it becomes easy to interconnect the jumper wires 4 by using the connecting members 10 described above, so that time required for the coil windings can be reduced, resulting in achieving reduction in product costs. In addition, because of the same reasoning, according to the stator manufacturing method described above, it becomes easy to interconnect the jumper wires 4 by such convenient steps, so that the time required for the coil windings can be reduced, resulting in achieving reduction in the product costs.

Next, the explanation will be made for a structure of the connecting members 10 that are conductors used for electrically interconnecting the respective jumper wires 4 through the conductors. These conductors are constituted of the conductive coil-connecting terminals 5 and the conductive connection members 6 as already described. In the case of the divided cores, a jumper-wire interconnecting process is performed after ending the coil windings around the teeth 71 in the state illustrated in FIG. 6, and after the divided cores 7 are returned into a column shape. In a case of a non-divided core, the process is performed similarly after ending the coil windings around the teeth 71.

Because the jumper wires 4 are disposed concentratedly at the back of the coil bobbins 2 as already described above, there arises a problem in that physical interference occurs between connecting wires for connecting directly between the jumper wires, when the interconnections between the jumper wires 4 become increased to satisfy the coil connection specification. In order to reduce the physical interference, the jumper wires 4 are electrically interconnected using the conductive coil-connecting terminals 5 and the conductive connection members 6 described above. The other ends of the conductive coil-connecting terminals 5 than those directly and electrically connected to the jumper wires 4 are pulled out toward a radially inner side of the stator so as not to obstruct other wires for connection, and any two of the thus pulled out portions of the conductive coil-connecting terminals 5 are interconnected by the conductive connection member 6 in arced shape. With this structure, the problem of the physical interference described above is significantly mitigated.

Figure 9:
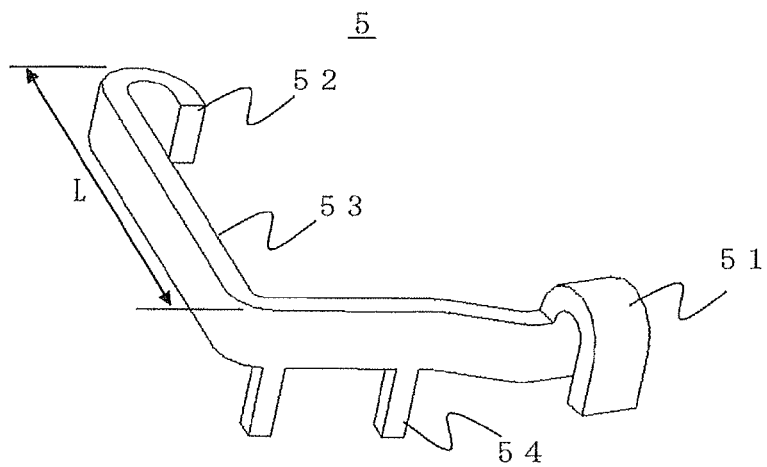
FIG. 9 is a diagram showing a conductive coil-connecting terminal according to Embodiment 1 of the present invention.

In FIG. 9, one example of such a conductive coil-connecting terminal 5 is shown. The conductive coil-connecting terminal 5 shown here is entirely made of a conductor that includes curved portions 51 and 52 on its both ends, an extension conductor portion 53 for connecting both of the ends, and support portions 54. The jumper wire 4 is passed through an open-figured port of the curved portion 51. The curved portion 51 is associated with the open-figured port as shown in the figure in its early stage, which is a specific example for the open-figured ports of the connecting members described before. The open-figured port of the curved portion 51 is placed opposite to a core end-face, and the jumper wire 4 is passed through inside the open-figured port of the curved portion 51 in a manner that the open-figured port falls over the jumper wire. Because the jumper wire 4 is coated with a dielectric material, the jumper wire 4 and the conductive coil-connecting terminal 5 are processed, in a manner that the jumper wire 4 is inserted into the open-figured port of the curved portion 51, by a method of welding such as fusing, TIG welding or resistance welding so as to easily make direct electrical conduction therebetween, so that both of the conductive members are electrically connected to each other and also fixed together. The connection and fixing may be achieved by swaging, brazing, soldering or like method, after partially removed off the dielectric material coated on the jumper wire 4. Due to the press-bonding between the curved portion 51 and the jumper wire occurred at the time of the welding process or the like, the curved portion 51 is pressed down so that there does not exist a so-called open-figured port in a strict sense, resulting in a state remaining only an end of the open-figured port. In this application of the invention, that end itself is additionally referred to as the "open-figured port" in a broad sense. The curved portion 52 is a portion that is directly and electrically connected to the conductive connection member 6. Although the shape of the extension conductor portion 53 is here shown in a bent shape, the shape as well as its overall thickness and/or height is not limited to that shown in the figure, i.e. the shape may be changed depending on the positions of connection points or other conditions. The support portions 54 are structural portions provided for supporting the conductive coil-connecting terminal 5 at surfaces of the coil bobbin 2 near its guide grooves 22 and 23 by way of these support portions 54. There are the support portions 54 at two places, because they are provided to support astride the jumper-wire pass-through hole 24.

Figure 10:
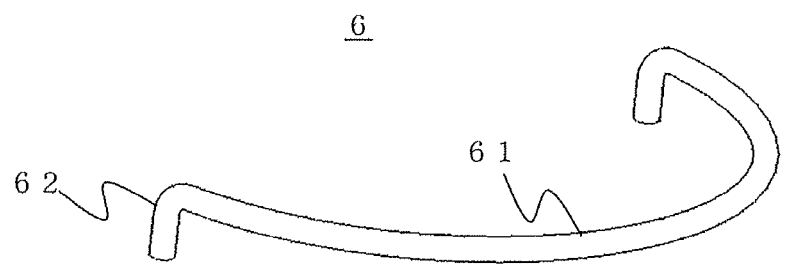
FIG. 10 is a diagram showing a conductive connection member according to Embodiment 1 of the present invention.

FIG. 10 is a diagram showing a conductive connection member 6 for electrically interconnecting the conductive coil-connecting terminals 5. The connection member 6 is usually coated for electrical insulation, and has an arc-shaped conductor portion 61 shaped like a hoop and bend portions 62 bent on both of the ends. The bend portions 62 on both of the ends are each inserted into the curved portion 52 of each conductive coil-connecting terminal 5 shown in FIG. 9, and both the portions are directly and electrically connected to each other by a similar method to the method described above that connects the curved portion 51 to the jumper wire 4, for example, by fusing, TIG welding or doing the like. Accordingly, the jumper wires are electrically connected to each other by two conductive coil-connecting terminals 5 and one conductive connection member 6 that connects between the terminals.

Figure 11:
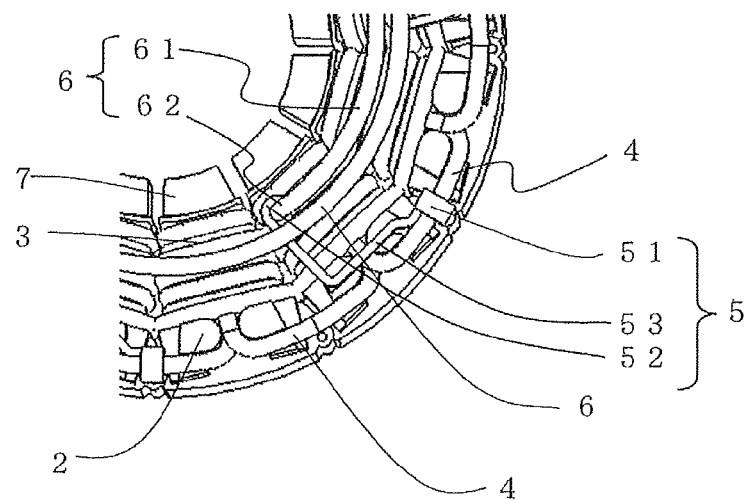
FIG. 11 is a diagram illustrating a region around jumper wires according to Embodiment 1 of the present invention.

FIG. 11 is a diagram for explaining processes for the jumper wires 4 placed between the respective coils 3 wound around each of the adjacent teeth 71 according to this embodiment. The jumper wires 4 pass through the guide grooves 22 and 23 provided at the back of the coil bobbins 2, and connected to the coils 3 of the adjacent teeth 71. The open-figured port of the curved portion 51 of the conductive coil-connecting terminal 5 shown in FIG. 9 is placed opposite to the jumper wire 4 at a core end-face; the jumper wire 4 is then inserted into the open-figured port in a manner that the curved portion 51 falls over the jumper wire 4; the leading ends of the support portions 54 are then pressed firmly toward electrical insulation surfaces (not shown in the figure) of the coil bobbin 2 near the guide grooves so as to support the conductive coil-connecting terminal 5; and at the same time, the curved portion 52 at the other end of the extension conductor portion 53 is disposed at a predetermined position of the stator 1 nearer to its radially inner side. For other jumper wires 4, the conductive coil-connecting terminals 5 are similarly disposed (not shown in the figure). With respect to two pieces of the conductive coil-connecting terminals 5 as disposed above, the bend portions 62 of the conductive connection member 6 shown in FIG. 10 are inserted into the respective curved portions 52. The curved portions 51 and 52 are processed as already described above, for example, by a method of fusing, TIG welding or doing the like, and accordingly, two jumper wires 4 placed at positions apart from each other are electrically connected by way of the conductive coil-connecting terminals 5 and the conductive connection member 6. When there exists a plurality of sets of the jumper wires 4 being targets to be connected to each other, the respective curved portions 52 to be pulled out toward the radially inner side of the stator 1 are designed to be placed at different positions, whereby the physical interference between the conductive connection members 6 themselves is significantly reduced. In FIG. 11, an example is illustrated in that two pieces of the conductive connection members 6 are disposed at different positions toward the radially inner side of the stator 1. As to the conductive coil-connecting terminals 5, because their curved portions 51 are to be disposed at the positions of respective jumper wires 4, the physical interference between the conductive coil-connecting terminals 5 themselves can be disregarded.

Here, the insertion and fixation of the jumper wires into the open-figured ports of the curved portions 51 of the conductive coil-connecting terminals 5 are made after the divided cores are annularly disposed as already described above. Although the conductive coil-connecting terminals 5 are disposed at an end-face side of the annularly disposed divided-cores where the jumper wires are placed, the curved portions 51 have the structure opened toward the end-face of the divided cores. Therefore, after once adjusting positionally the open-figured ports of the curved portions 51 to meet the respective jumper wires 4, it becomes possible to insert the jumper wires 4 into the open-figured ports of the curved portions 51, merely by driving the curved portions 51 in the direction approaching toward the jumper wires 4. When the above work is to be automated, three directional drive controls are required to be enough instead of conventional five directional drive controls. When simply focusing on direct insertion step for comparison, three directional drive controls have been conventionally required, whereas a single directional drive control is required to be enough in the present invention. Thus, drive controls are simplified, resulting in achieving cost reduction together with reduction in the connection work hours. In addition, if there is no sufficient space between the jumper wires 4 and the end-face of the annularly disposed divided-cores, or between the jumper wires and surroundings of the end-face, it possibly be difficult or more time consuming by the use of the conventional connecting members to accomplish connections, whereas those difficulties can be significantly mitigated according to the present invention. Therefore, in this regard, it becomes possible to enhance the efficiency in work for connecting between the jumper wires 4, contributing to further increasing productivity of the rotating electric machine stator. Moreover, it is possible to reduce the distance between the jumper wire 4 and the core end-face according to the present invention, so that the axial length of the rotating electric machine stator can be shortened.

Note that, in the above explanation, the conductive coil-connecting terminals 5 are not coated for electrical insulation, and the conductive connection members 6 are coated for electrical insulation; however, it is not necessarily limited to this, namely, at least either of both may be coated therefore.

Figure 12:
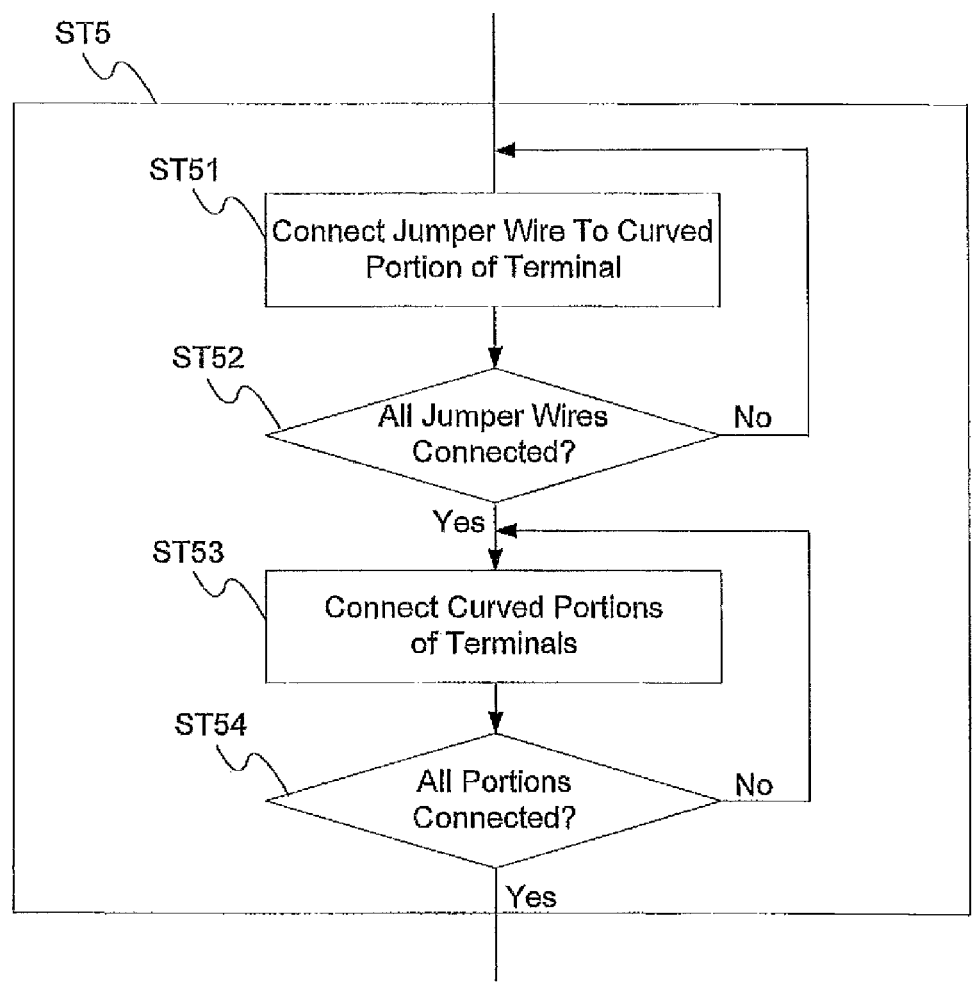
FIG. 12 is a flow chart showing in detail a jumper-wire interconnecting step in the method of manufacturing the rotating electric machine stator according to Embodiment 1 of the present invention.

While the stator manufacturing method for the rotating electric machine according to this embodiment is basically the same as that in FIG. 8, the corresponding step to Step 5 (=ST5) in FIG. 8 can be divided into more detailed steps, for example, as Step 51 (=ST51) through Step 54 (=ST54) shown in FIG. 12.

Step 51 is for electrically connecting between the jumper wire 4 being a target for connection and the curved portion 51 of the conductive coil-connecting terminal 5. As already described above, first, the open-figured port of the curved portion 51 is placed opposite to the core end-face, and the jumper wire 4 is then inserted into the open-figured port in a manner that the curved portion 51 is moved so that its open-figured port falls over the jumper wire 4. Next, the electrical connection between the jumper wire 4 and the curved portion 51 is achieved. At the same time, both of them are also fixed to each other. At Step 52, it is determined whether or not the work at Step 51 has been completed for all of the jumper wires 4 required to be interconnected, and the connection work is conducted until it is completed. Next, at Step 53, electrical connections are made using the conductive connection member 6 between the corresponding curved portions 52 of the conductive coil-connecting terminals 5 that are connected, to each set of the jumper wires 4 that require the interconnection between the jumper wires 4. To be specific, the bend portions 62 of the conductive connection member 6 are inserted into the open-figured ports of the curved portions 52 that are opened in axial core directions, and they are then connected together respectively by a similar method as the jumper wires 4 that are connected to the curved portions 51. At Step 54, it is determined whether or not the work at Step 53 has been completed for all of the jumper wires 4 required to be interconnected, and the connection work is conducted until it is completed.

Alternatively in another method, the connection work may be conducted in a sequential manner that the work at Step 51 and Step 53 is conducted for a predetermined set of jumper wires 4 required to be interconnected therebetween, and then the work at Step 51 and Step 53 is conducted sequentially for any other predetermined set of jumper wires 4 required to be interconnected therebetween.

The above explanation is for connecting between two places of the jumper wires 4; however, when three places of the jumper wires 4 are connected to each other, three pieces of conductive coil-connecting terminals 5 and two pieces of conductive connection members 6 are required. Firstly, three pieces of the conductive coil-connecting terminals 5 are connected to three places of the jumper wires 4 being targets for connection. For one of among the three pieces of the conductive coil-connecting terminals 5, an open-figured port size of the curved portion 52 is enlarged so as to enable inserting two of the bend portions 62 of the conductive connection members 6. Other work is the same as the explanation made above. According to the manner described above, three places of the jumper wires 4 are electrically connected.

In that case, the open-figured port shape of the curved portion 52 that allows insertion of two of the bend portions 62 thereto, is considered to be either of two types. One type is an open-figured port extending circumferentially, with which the corresponding two conductive connection members 6 are disposed at radially the same positions in a direction toward the inner side of the core. The other type is an open-figured port extending in a radial direction of the core, with which the corresponding two conductive connection members 6 are disposed at radially different positions in a direction toward the inner side of the core. In the case of the open-figured port extending in the radial direction of the core, it may be possible to tentatively determined the positions of the bend portions 62 to be inserted into the open-figured port by applying an appropriately designed shape to the open-figured port, so that the difference between the radial positions of the two conductive connection members 6 in the direction toward the inner side of the core can be made large or small. In the case of four of more pieces of jumper wires, it is possible to connect similarly to the case of the three pieces thereof.

In another method to connect between three jumper wires 4, one of the three pieces of the conductive coil-connecting terminals 5 has two curved portions 52. Each one of the bend portions 62 of the conductive connection members 6 is inserted into each of the two curved portions 52 and connected together. Here, the two curved portions 52 provided on the same conductive coil-connecting terminal 5 may be placed at radially different positions to each other in the direction toward the inner side of the core. It is also possible to connect between four or more jumper wires to each other, in accordance with any selected method or its combination among the above described ones for connecting the three jumper wires.

Moreover, still another method to connect between jumper wires interconnecting method may be adopted in which the same number of the conductive coil-connecting terminals 5 as the number of the jumper wires to be mutually connected, are electrically connecting in advance to the conductive connection members 6 required for connecting these terminals, and thereafter each of the jumper wires 4 is connected to each of the curved portions 51 of the conductive coil-connecting terminals 5.

In the coil connection structure in FIG. 4 that satisfies the coil connection specification shown in FIG. 3, two sets for each of three types of the conductive coil-connecting terminals 5 are used with the curved portions 52 placed at radially different positions for every type in the direction toward the inner side as shown in FIG. 4, and the curved portions 52 in the set of each type of conductive coil-connecting terminals 5 are interconnected by means of the conductive connection members 6. The lengths of the arc-shaped conductor portions 61 of the conductive connection members 6 differ depending on the radial positions of the curved portions 52, to which the members are connected, in the direction toward the inner side of the stator 1.

Note that, it is not always necessary to dispose both ends of the bend portions 62 of the conductive connection members 6 at radially the same positions in the direction toward the inner side of the stator 1. Namely, it is not always required for the extension conductor portions 53 of two sets of the conductive coil-connecting terminals 5 directly connected by the conductive connection members 6 that the lengths L from the bend positions to the curved portions 52 be the same. When these lengths are the same, the arc-shaped conductor portions 61 are placed in a circular arc centering the axis of the stator 1; however, when these are different, such a placement is not provided. When there is little other interfering member, the latter arrangement does not particularly cause a problem.

Thus, according to this embodiment, it becomes possible to achieve simplification of the interconnecting step between the jumper wires 4, by placing the open-figured ports of the curved portions 51 of the conductive coil-connecting terminals 5 opposite to the core end-face, and by causing the jumper wires 4 inserted into the open-figured ports in a manner that the open-figured ports fall over the jumper wires 4, to make connection between the jumper wires 4. Because of the enhanced efficiency in the connection work, it becomes possible to achieve increasing productivity of the rotating electric machine stator. This does not depend on using the divided cores 7, the chain-joint type divided cores 9, or an integral core.

Moreover, by implementing the connections between the jumper wires 4 and the conductive coil-connecting terminals 5 and between the connection members 6 and the terminals using fusing, TIG welding or doing the like, their electrical connections can be easily achieved, also resulting in contributing to reduction in stator manufacturing steps for the rotating electric machine.

The above explanation is made, with reference to the coil connection specification in FIG. 3 as an example, for the case where the coils are formed by sequentially winding around each of the magnetic pole teeth using one line of wire; however, the coil connection specification is not necessarily limited to that shown in FIG. 3, nor necessarily limited to the windings using one line of wire. For example, when the magnetic pole teeth are wound for each phase of the three phases using one line of wire per phase, there exist the jumper wires that cause a problem in looseness of the coils, so that it may become necessary to electrically connect between the jumper wires depending on the coil connection specification. In that case, by adopting the present invention according to this embodiment, it is possible to achieve those effects similar to the effects described above.

Embodiment 2.

Figure 13:
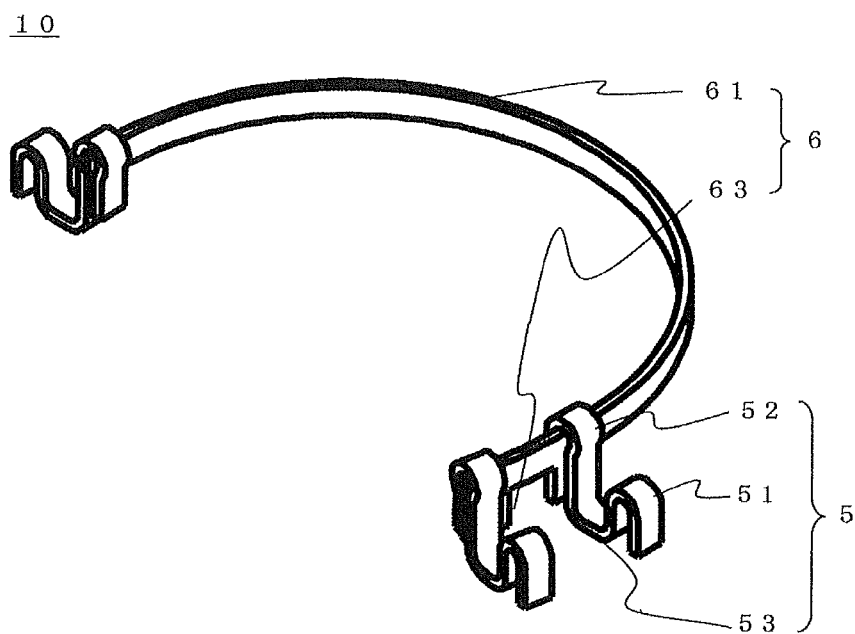
FIG. 13 is a diagram showing a connecting member according to Embodiment 2 of the present invention.

A connecting member 10 according to this embodiment is shown in FIG. 13.

The connecting member 10 shown in FIG. 13 is constituted of conductive coil-connecting terminals 5 and a conductive connection member 6, which is the same manner as in Embodiment 1; however, their respective structures are different from those in Embodiment 1. The conductive coil-connecting terminals 5 each are constituted of curved portions 51 and 52, and extension conductor portions 53 that interconnect both the curved portions. The extension conductor portions 53 are disposed at the positions lower than the curved portions 51 and 52, namely, the positions nearer to a core end-face. In addition, the curved portions 52 each have, like the curved portions 51, an open-figured port on its core end-face side, which is different from the case in Embodiment 1. Next, the conductive connection member 6 is constituted of an arc-shaped conductor portion 61 and connecting parts 63, and the connecting parts 63 are being provided in place of the bend portions 62 in Embodiment 1 so as to make the contact area with the curved portions 52 larger to thereby ensure the electrical connection between the conductive coil-connecting terminals 5 and the conductive connection member 6. Thus, the connecting parts 63 are not essential and may be omitted.

Note that, the surface of the conductive connection member 6 is usually treated for electrical insulation. This is to prevent electric conduction between respective conductive connection members 6 from contacting with each other. However, if another means is separately provided to prevent such conduction, it may not be required to treat for electrical insulation both of the conductive coil-connecting terminals 5 and the conductive connection members 6.

How to electrically connect between the conductive coil-connecting terminals 5 and the jumper wires 4 is the same as the method described in Embodiment 1. Electrical connection between the conductive coil-connecting terminals 5 and the conductive connection member 6 differs from the case in Embodiment 1, that is, the arc-shaped conductor portion 61 is inserted into the open-figured ports of the curved portions 52 in a manner that the open-figured ports of the curved portions 52 of the conductive coil-connecting terminals 5 fall over the arc-shaped conductor portion 61 of the conductive connection member 6, and then, by a similar method for making connection to the jumper wires 4, both of them are fixed together to establish their electrical conduction. Namely, in this embodiment, both of the curved portions 51 and 52 cause the targeted objects to be inserted into their open-figured ports in a manner that their open-figured ports of the respective curved portions fall over the targeted objects.

Depending on the length of the extension conductor portions 53 of the conductive coil-connecting terminals 5, it is possible to change the radial positions of the disposed conductive connection members 6 in the direction toward the inner side of the core. In addition, the conductive connection member 6 is disposed at the position more apart from the core end-face than the extension conductor portions 53 as shown in FIG. 13, so that the mutual interference between one and another conductive connection members 6 is avoided by placing at the position of the extension conductor portions 53, the arc-shaped conductor portion 61 of the another conductive connection member for interconnecting other jumper wires.

A method of interconnecting the jumper wires will be described using the conductive coil-connecting terminals 5 and the conductive connection member 6 according to this embodiment.

Firstly, the number of the jumper wires 4 being targets to be interconnected are presumed to be three, for example, according to FIG. 13. A conductive connection member 6 is prepared that has an arc-shaped conductor portion 61 having the length capable of covering the circumferential angle corresponding to the three places of the jumper wires 4. Next, the conductive connection member 6 is disposed at a predetermined radial position that is nearer to the inner side and is corresponding to the positions of the jumper wires 4 being the targets to be interconnected above the core end-face. Then, the conductive coil-connecting terminals 5 are disposed at the positions of the respective jumper wires 4 being the targets to be interconnected. At this arrangement, the jumper wires are inserted into the open-figured ports of the curved portions 51 of the conductive coil-connecting terminals 5 in a manner that the open-figured ports fall over the jumper wires 4 and then fixed together to establish their electrical conduction. As to the case similarly between the arc-shaped conductor portion 61 and the curved portions 52, the arc-shaped conductor portion 61 is inserted into the open-figured ports of the curved portions in a manner that the open-figured ports fall over the arc-shaped conductor portion 61, and then fixed together to establish their electrical conduction. By adopting the method as described above, it is possible to advantageously conduct the connection work between the jumper wires while adjusting arranged positions of the conductive coil-connecting terminals 5 and the conductive connection member 6 so as to meet the actual jumper-wire positions. Moreover, because the arc-shaped conductor portion 61 is of a simple shape, there is another advantage in that the connection member is easily manufactured and can be treated as a general-purpose component by adjusting its length by appropriately cutting it or doing the like.

Note that, another method for interconnecting the jumper wires 4 using the connecting member 10 in FIG. 13 is that the conductive coil-connecting terminals 5 and the conductive connection member 6 are connected in advance by way of the curved portions 52 to constitute an integral connecting member 10, and this integral member is repeatedly prepared for a required number, by which the jumper wires 4 and the respective curved portions 51 are interconnected, taking care of their mutual physical interference. The connecting method for the respective curved portions is already described above. According to this method for connection, the connection work to the jumper wires can be conducted using the connecting member 10 as an integral component, and therefore, the workability will be enhanced with the actual things, in comparison with the case in which the connection work is conducted by separately handling the conductive coil-connecting terminals 5 and the conductive connection member 6. However, because a degree of freedom for positioning is reduced, it is necessary to adequately confirm in advance each arrangement design to be required.

When there is a plurality of sets of jumper wires 4 required to be interconnected, the connection work described above is to be applied to each set, and therefore there may be a case in which a plurality of connecting members 10 interfere physically with one another. To be specific, there may be physical interference between the conductive connection members 6 themselves, and physical interference between the conductive coil-connecting terminals 5 and/or the conductive connection members 6.

Dealing with the physical interference between the conductive connection members 6 themselves, the conductive connection members 6 are disposed at radially different positions in the direction toward the inner side of the core. In this case, the respective conductive coil-connecting terminals 5 that have the extension conductor portions 53 with the lengths corresponding to the above positions are prepared, and then the respective arc-shaped conductor portions 61 are inserted and fixed in the open-figured ports of the curved portions 52 of the corresponding conductive coil-connecting terminals, and also the jumper wires 4 are inserted and fixed in the open-figured ports of the curved portions 51 to establish their electrical connection.

The physical interference between the conductive coil-connecting terminals 5 and the conductive connection members 6 is to be resolved as follows. Namely, the arc-shaped conductor portions 61 of the conductive connection members 6 are placed to pass through above the extension conductor portions 53 that may otherwise interfere with the extension conductor portions. "To pass through above the extension conductor portions 53" means that the arc-shaped conductor portions 61 are disposed at the position more apart from a core end-face toward the position of the jumper wires 4 as a reference, than that of the extension conductor portions 53 that may otherwise interfere. The reason why the extension conductor portions 53 are disposed at the lower positions than the curved portions 51 and 52 in this embodiment is to prevent the interference described above. Note that, in order to prevent electric conduction due to the contact between an arc-shaped conductor portion 61 and another arc-shaped conductor portion 61 of another connecting member 10, or the contact between an arc-shaped conductor portion 61 and a conductive coil-connecting terminal 5 of another connecting member 10, it is suitable, for example, that the surfaces of the conductive connection members 6 be treated for electrical insulation. If the conductive connection members 6 are disposed at such positions that the contacts described above do not occur, and a measure to restrict their displacement from such positions is taken, it is not always necessary to treat for electrical insulation the surfaces of the conductive connection members 6 as described above.

Embodiment 3.

Figure 14:
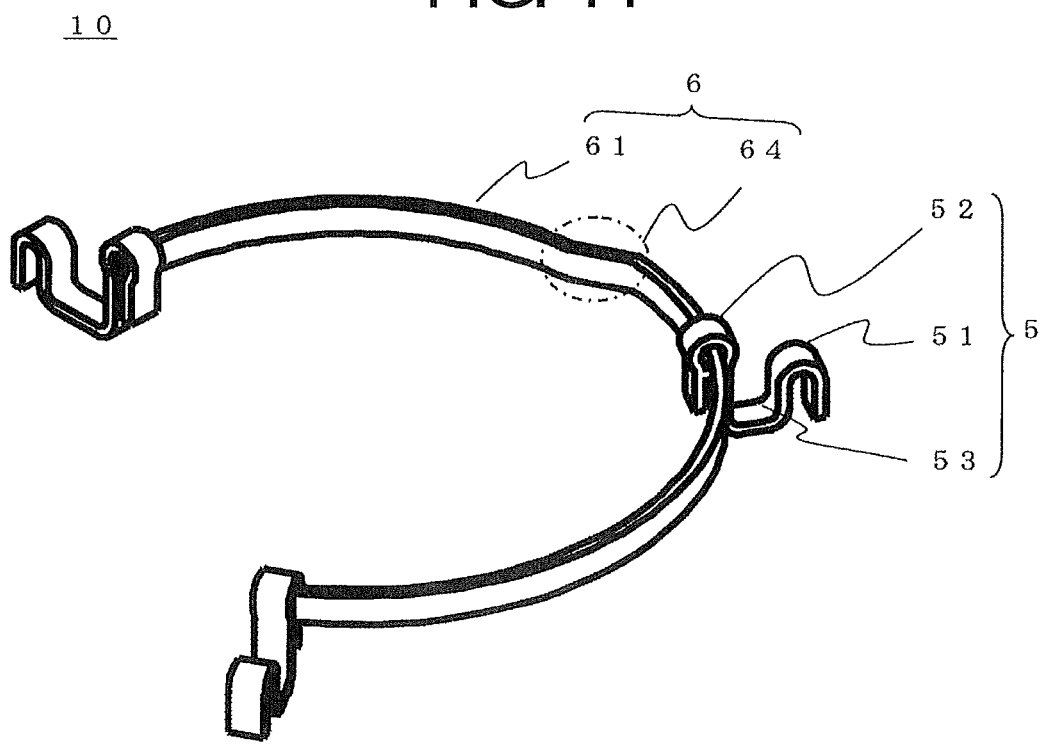
FIG. 14 is a diagram showing a connecting member according to Embodiment 3 of the present invention.

Another example of a connecting member 10 according to this embodiment is shown in FIG. 14.

The connecting member 10 shown in FIG. 14 is basically the same in its structure as that in Embodiment 2; however, it differs from Embodiment 2 in the points that an arc-shaped conductor portion 61 of conductive connection member 6 has an inflected portion 64, whereby the radii of curvature of the arc-shaped conductor portion 61 are different across the inflected portion 64. In Embodiment 2, radial positions of the conductive connection member 6 placed over the core end-face and in the direction toward the inner side of the core are not different from each other, unless otherwise referred to the relation between a set of the arc-shaped conductor portions 61 of different connecting members 10; however, in this embodiment, it is possible to change the radial positions of arc-shaped conductor portion 61 in the direction toward the inner side of the core even in one same connecting member 10. According to this arrangement, it becomes easier to avoid the physical interference between any set of different connecting members 10.

Embodiment 4.

Figure 15:
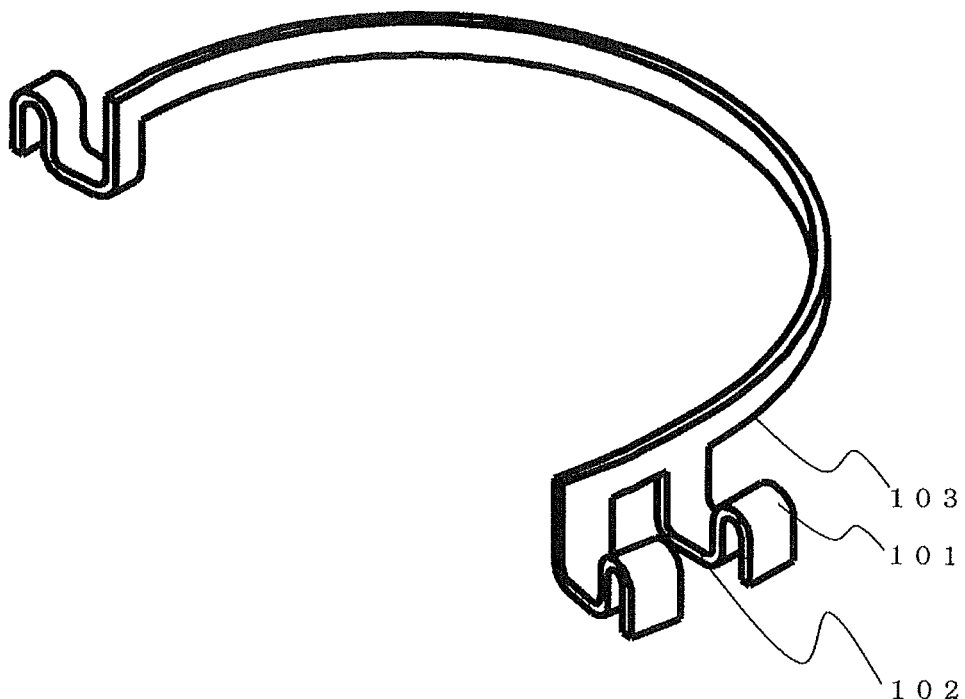
FIG. 15 is a diagram showing a connecting member according to Embodiment 4 of the present invention.

A connecting member 10 according to this embodiment is made as an integral component from the beginning. An example corresponding to that in Embodiment 2 is shown in FIG. 15. FIG. 15 shows an example of the member corresponding to that in FIG. 13, for connecting three jumper wires 4 to each other. In FIG. 15, numeral "101" designates bend portions of the connecting member 10; numeral "102," extension conductor portions of the connecting member 10; and numeral "103," an arc-shaped conductor portion of the connecting member 10. The bend portions 101, the extension conductor portions 102 and the arc-shaped conductor portion 103 correspond to the curved portions 51, the extension conductor portions 53 and the arc-shaped conductor portion 61 in Embodiment 2 and Embodiment 3, respectively. The number of jumper wires being targets to be interconnected is not necessarily limited to three.

By forming the connecting member 10 into the integral one, the number of manufacturing components for the connecting member 10 is decreased to reduce production costs, and in addition, the connection work between conductors is also simplified to enhance the workability, and therefore it is possible to further reduce the manufacturing costs. However, as different from the cases in Embodiment 1 through Embodiment 3, it is required to make the connecting member on demand basis in accordance with jumper-wire connection specifications. Therefore, general versatility of the aforementioned connecting member 10 is less in comparison with the case in which the connecting member is constituted of two separated types of members as described in Embodiment 1 through Embodiment 3.

Embodiment 5.

Figure 16:
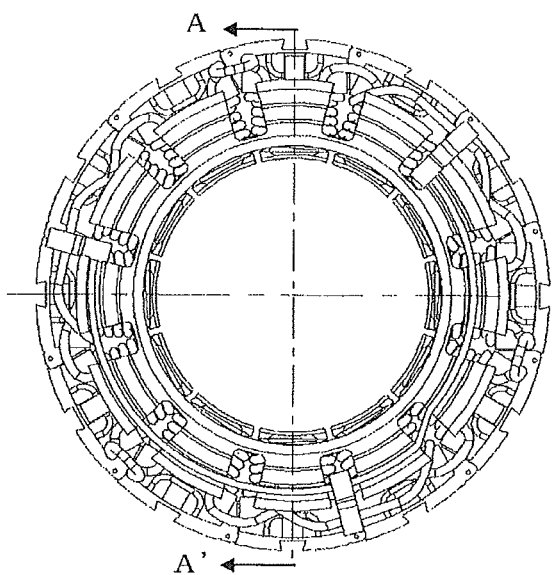
FIG. 16 is a plan view illustrating a grooved dielectric member according to Embodiment 5 of the present invention.
Figure 17:
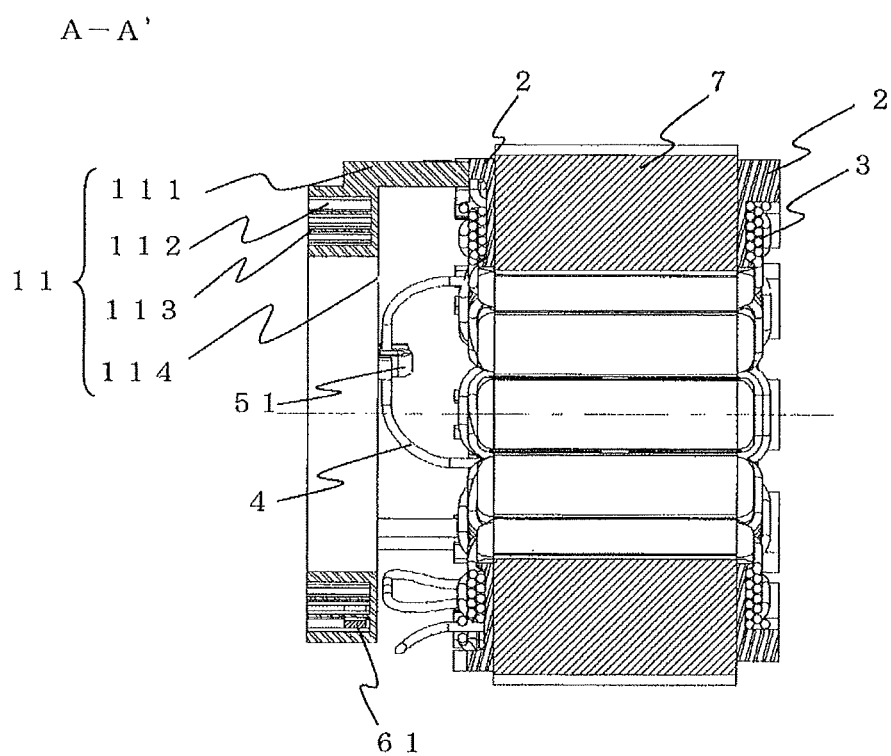
FIG. 17 is a cross-sectional view illustrating the grooved dielectric member according to Embodiment 5 of the present invention.

This embodiment shows another example taking a structure of the connecting members 10 described in Embodiment 3, in which a grooved dielectric member is disposed that acts as a means to restrict positions of the connecting members 10 so as to prevent mutual contact between the conductive connection members 6 having radially different positions toward the inner side, and to prevent contact between the conductive connection members 6 and the conductive coil-connecting terminals 5 of another set of connecting members 10. A plan view of a core end-face is illustrated in FIG. 16, and a cross-sectional view taken from the line A-A' shown in FIG. 16 is illustrated in FIG. 17. In FIG. 17, the items designated with the same reference numerals as those described from Embodiment 1 to Embodiment 4 stand for the same items. Numeral "11" is the grooved dielectric member; numeral "111," a mounting support portion for totally supporting the grooved dielectric member 11 mounted on the coil bobbins 2; "112," a plurality of groove portions formed in the grooved dielectric member 11; "113," separation walls made of a dielectric material for separating between the groove portions 112 of the grooved dielectric member 11; and "114," a bottom portion of the grooved dielectric member 11. As shown in FIG. 17, the grooved dielectric member 11 is mounted on the coil bobbins 2 so that the bottom portion 114 described above is disposed at the position more apart from the core end-face than that of the jumper wires 4.

In the groove portions 112, the arc-shaped conductor portions 61 are disposed, and the separation walls 113 mutually separate between the arc-shaped conductor portions 61 differently disposed at radial positions in a direction toward the inner side of the core. According to this arrangement, if the arc-shaped conductor portions 61 radially move toward the inner side of the core, their displacement is restricted and their mutual contacts in radial directions can be prevented by means of the dielectric material separating them.

Next, the explanation will be made how to prevent contact between an arc-shaped conductor portion 61 and an extension conductor portion 53 of the conductive coil-connecting terminals 5 of another connecting member 10. At the positions where the conductive coil-connecting terminals 5 are disposed, the grooved dielectric member 11 is not disposed, because it will cause obstruction. For this reason, there is a possibility that the arc-shaped conductor portions 61 that pass through those positions may be in contact with the extension conductor portions 53. However, the jumper wires 4 are disposed at the same height with the bottom portion 114 of the grooved dielectric member 11 or at a lower position than that of the bottom portion, and, as is clear from FIG. 14, the extension conductor portions 53 are disposed at lower positions than those of the curved portions 51, although not clearly shown in FIG. 17. The height herein refers to the magnitude of the length from the nearest core end-face. When the dielectric member thickness of the bottom face of groove portions 112 is also taken into consideration, it is possible to maintain sufficient space between both of these portions, and therefore, mutual contact does not occur between both of these portions. Accordingly, in the present invention according to this embodiment, it is possible to prevent electric conduction due to the mutual contact of the connecting members without applying an electrical insulating treatment to the surfaces of the connecting members.

While the present invention has been shown and described in detail, the foregoing description is in all aspects illustrative and not restrictive. It is therefore understood that numerous modifications and variations can be realized without departing from the scope of the invention.

Industrial Applicability

The present invention can be utilized for interconnecting the windings of a rotating electric machine stator having jumper wires between magnetic pole coils, and the jumper wires thereof.

[Explanation of Numerals and Symbols]

Numeral "1" designates a stator; "2," coil bobbin; "3," coil; "4," jumper wire; "5," conductive coil-connecting terminal; "6," conductive connection member; "7," divided cores; "8," teeth fixing and rotating jig; "9," chain-joint type divided cores; "10," connection member; "11," grooved dielectric member; "21," coil winding portion; "22," winding-start jumper-wire guide groove; "23," winding-end jumper-wire guide groove; "24," jumper-wire pass-through hole; "51," first curved portion of a conductive coil-connecting terminal; "52," second curved portion of a conductive coil-connecting terminal; "53," extension conductor portion of a conductive coil-connecting terminal; "54," support portions of a conductive coil-connecting terminal; "61," arc-shaped conductor portion of a conductive connection member; "62," bend portions of a conductive connection member; "63," connecting parts of a conductive connection member; "64," inflected portion of a conductive connection member; "71," teeth of stator cores; "101," bend portions of a connection member; "102," extension conductor portions of a connection member; "103," arc-shaped conductor portion of a connection member; "111," support portion of grooved dielectric member; "113," separation walls of grooved dielectric member, and "114," bottom portion of grooved dielectric member.

What is claimed is:

1. A rotating electric machine stator, comprising:
   a core having a plurality of magnetic pole portions;
   coils wound around the respective plurality of magnetic pole portions;
   jumper wires for electrically interconnecting the coils adjacent to each other by way of wires integral with the adjacent coils; and
   connecting members for electrically connecting between the jumper wires placed at different positions, wherein
   each of the connecting members includes a plurality of conductive coil-connecting terminals having the open-figured ports made of conductors that are opened toward an end-face of the core, and a conductive connection member for electrically connecting between the plurality of conductive coil-connecting terminals;
   the plurality of conductive coil-connecting terminals each include, in addition to the open-figured ports, connection parts that are placed nearer to a radially inner side of the core than the open-figured ports and made of conductors connected to the conductive connection member, and extension conductor portions that connect between the open-figured ports and the connection parts;
   the conductive connection member includes at least one arc-shaped conductor portion being a conductor of an approximately circular arc that is electrically connected to the respective connection parts of the plurality of conductive coil-connecting terminals to thereby interconnect between the connection parts; and
   the jumper wires are inserted and fixed in the open-figured ports being directed toward the end-face of the core, to electrically connect the jumper wires to the open-figured ports.

2. The rotating electric machine stator as set forth in claim 1, wherein the respective connection parts are all placed at the same radial positions toward the radially inner side, with respect to at least more than one of the plurality of conductive coil-connecting terminals.

3. The rotating electric machine stator as set forth in claim 1, wherein the respective connection parts are placed at partly different radial positions toward the radially inner side, with respect to at least one of the plurality of conductive coil-connecting terminals, whereby the conductive connection member is constituted by joining together a plurality of said arc-shaped conductor portions.

4. The rotating electric machine stator as set forth in claim 1, wherein each of the connection parts is curved to have an open-figured port, and the conductive connection member is inserted and fixed into the open-figured port of at least one of the connection parts.

5. A method of manufacturing a rotating electric machine stator, comprising coil winding steps at which coils are wound for a plurality of respective magnetic pole portions disposed circumferentially along their core in accordance with a coil connection specification, wherein the coil winding steps for the magnetic pole portions include a jumper-wire disposing step of disposing, between one and another magnetic pole portions, wires integral with the wound coils, as jumper wires, between coil winding processes for the respective magnetic pole portions, the method of manufacturing the rotating electric machine stator further comprising:

a preparing step of preparing connecting members for electrically connecting between the jumper wires placed at different positions, wherein each of the connecting members includes a plurality of conductive coil-connecting terminals having the open-figured ports made of conductors that are opened in one direction, and a conductive connection member for electrically connecting between the plurality of conductive coil-connecting terminals; and the plurality of conductive coil-connecting terminals each include, in addition to the open-figured ports, connection parts made of conductors connected to the conductive connection member, and extension conductor portions that connect between the open-figured ports and the connection parts, and a jumper-wire interconnecting step conducted after the coil winding steps, in which the connecting members are placed so that the connection parts are nearer to a radially inner side of the core than the open-figured ports facing an end-face of the core in accordance with the coil connection specification, and the jumper wires are passed through the open-figured ports and then fixed thereon for causing electrical connection, whereby the plurality of jumper wires are electrically connected to each other by way of the connecting members.

6. A rotating electric machine stator comprising:

a core having a plurality of magnetic pole portions;

coils wound around the respective plurality of magnetic pole portions;

jumper wires for electrically interconnecting the coils adjacent to each other by way of wires integral with the adjacent coils; and connecting members for electrically connecting between the jumper wires placed at different positions, wherein the connecting members each include a plurality of open-figured ports made of conductors that are opened toward an end-face of the core, and an interconnection conductor that is a conductor for interconnecting the plurality of open-figured ports; and the jumper wires are inserted and fixed in the open-figured ports being directed toward the end-face of the core, to electrically connect the wires to the open-figured ports;

and wherein the magnetic pole portions are attached thereon with respective coil bobbins each being a dielectric member;

the coils wound around the magnetic pole portions are those wound by means of the coil bobbins;

the coil bobbins attached on the magnetic pole portions each include, at around a circumference portion of the stator that corresponds to each of the magnetic pole portions, a first guide groove for guiding a coil's winding-start lead wire that is a jumper wire from an adjacent magnetic pole portion, a second guide groove for guiding a coil's winding-end lead wire that is a jumper wire to an adjacent magnetic pole portion, and a pass-through hole provided between the first guide groove and the second guide groove; and the coil's winding-start lead wire and the coil's winding-end lead wire wound for each of the magnetic pole portions run through the pass-through hole, and are guided into the first guide groove and out of the second guide groove, respectively.

7. The method of manufacturing a rotating electric machine stator as set forth in claim 5, wherein each of the connection parts is curved to have an open-figured port, and the conductive connection member is inserted and fixed into the open-figured port of at least one of the connection parts.

* * * * *